May 8, 1934.  A. P. STALLE  1,957,811
CIRCULAR OVEN
Filed Oct. 21, 1932  3 Sheets-Sheet 2
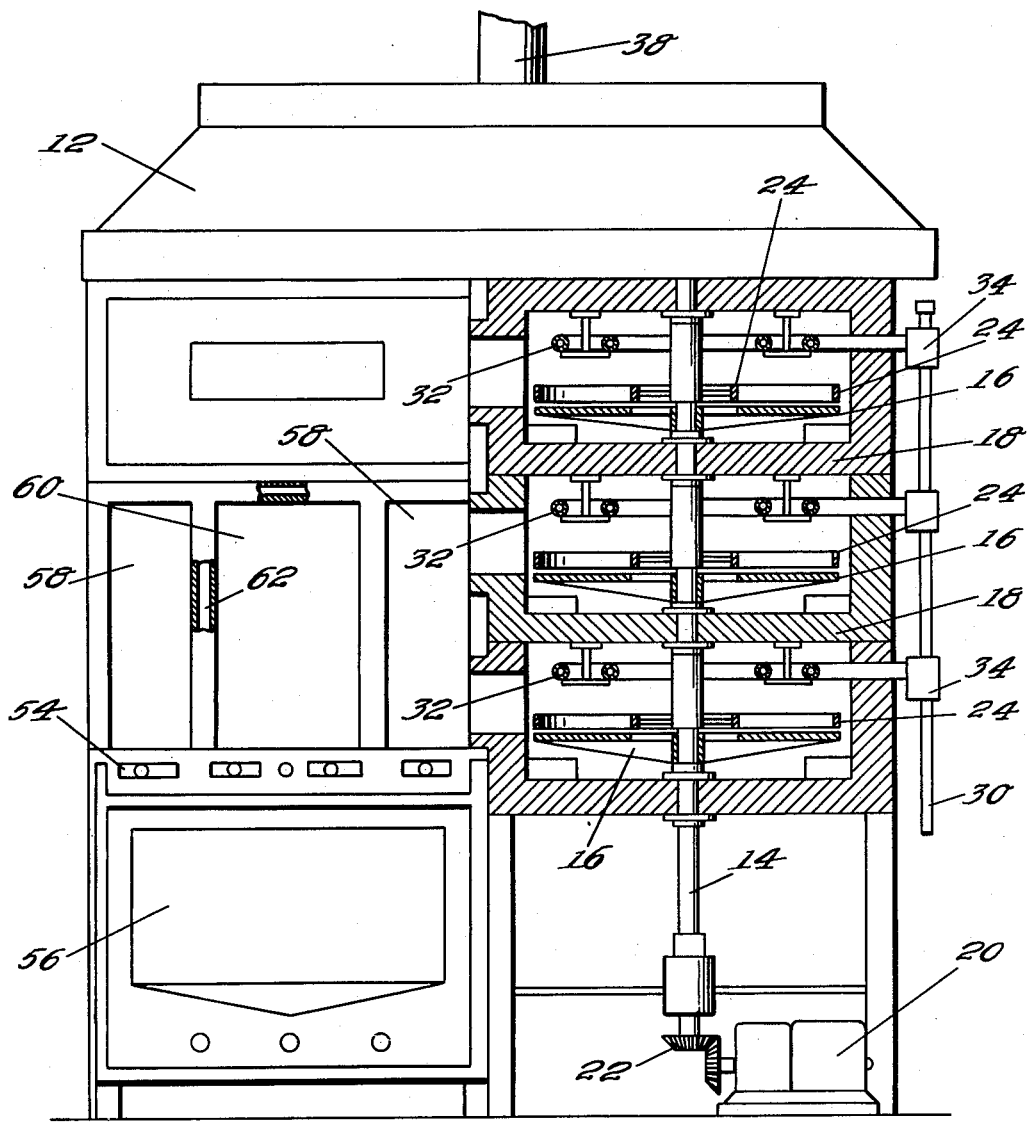
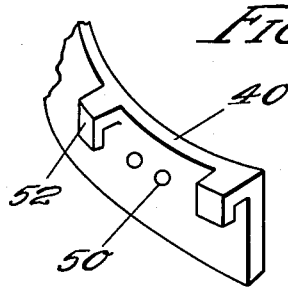
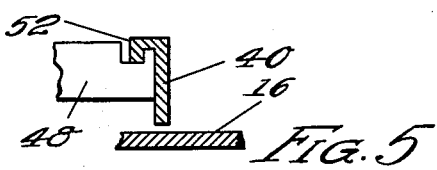
ALBERT P. STALLE
INVENTOR
PER
ATTORNEY May 8, 1934. A. P. STALLE 1,957,811
CIRCULAR OVEN
Filed Oct. 21, 1932 3 Sheets-Sheet 3

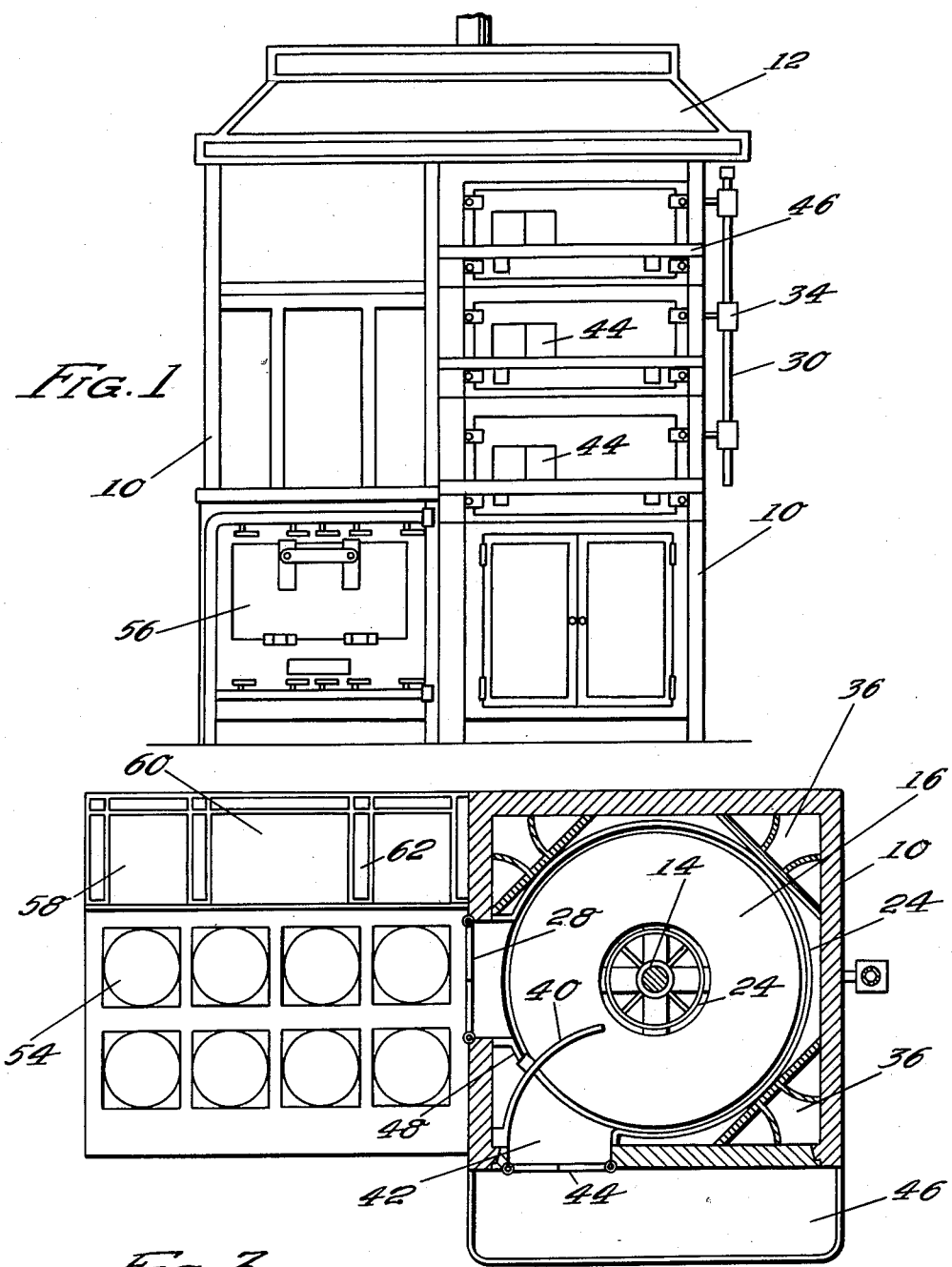

ALBERT P. STALLE
INVENTOR
PER
Albert J. Fihe
ATTORNEY

Patented May 8, 1934

1,957,811

UNITED STATES PATENT OFFICE 1,957,811

CIRCULAR OVEN

Albert P. Stalle, Chicago, Ill.

Application October 21, 1932, Serial No. 638,936

2 Claims. (Cl. 107—60)

This invention relates to an improved circular oven, and has for one of its principal objects the provision of means for cooking and heating treatment of food and other items wherein the heat treatment shall be accomplished automatically and within any desired period of time.

One of the important objects of this invention is to provide an oven for cooking food in casseroles or the like wherein the casseroles containing the food are placed in the oven in any one of a series of levels depending upon the time of cooking desired, and are automatically ejected therefrom after the cooking has been accomplished.

Still another important object of the invention resides in the provision of means for cooking and preparing the food and other articles which includes heat treatment in an oven wherein the objects to be so treated are supported on a revolving platform for a predetermined time, and then automatically removed therefrom while at the same time, if desired, remaining within the oven for continued warming purposes.

Another and still further important object of the invention resides in an oven associated with other means for preparing and cooking food, and also for preliminarily heating the containers in which the food is cooked and served.

Another object of the invention resides in the construction of an improved container for the food while in the process of preparation which container comprises a casserole or the like, the lid of which can also be used as a support or stand.

A further appurtenance of the invention comprises an improved supporting grill or the like for the preparation of steaks, toast and similar food items, which renders the preparation of such articles by heat treatment comparatively simple, and produces a tasty and appetizing product.

Other and further important objects of the invention will be apparent from the disclosures in the accompanying drawings and following specification.

The invention, in a preferred form, is illustrated in the drawings and hereinafter more fully described.

In the drawings:

Figure 1 is a front elevation of the improved circular oven and cooking means of this invention.

Figure 2 is a vertical sectional view of the circular oven and associated parts, certain portions being illustrated in full lines and others being shown as broken away.

Figure 3 is a horizontal sectional view of the circular oven, the associated cooker or range being shown in top plan view, and certain other portions being illustrated in section.

Figure 4 is a perspective view of the removable means for automatically discharging articles from the rotating oven.

Figure 5 is a detail view of a portion of the discharge means, illustrating particularly the removable feature.

As shown in the drawings:

Figure 6:
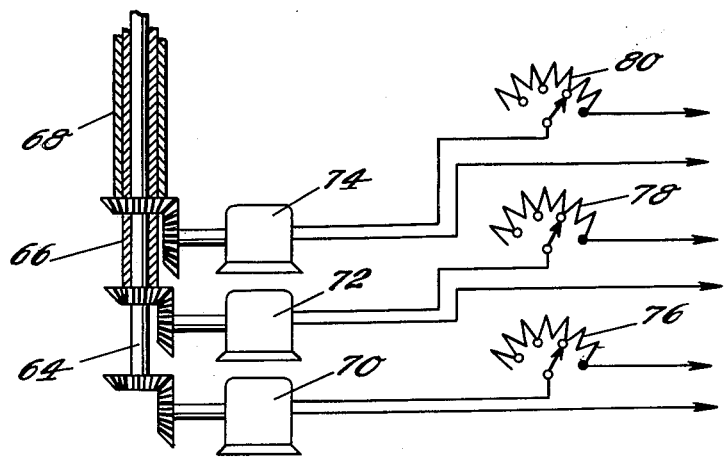
Figure 6 is a diagrammatic view of a modified form of the oven, illustrating particularly the means for producing various predetermined speeds of different operating levels of the oven.

The reference numeral 10 indicates generally the casing of the improved circular oven of this invention, this being of a suitable metal and insulated for the retention of heat, and surmounted with a canopy 12 of stainless metal or the like which canopy is employed for collection and subsequent discharge of flue gasses, smoke and the like.

The automatic oven of the invention is positioned at the right of the casing 10 and comprises essentially a central operating shaft 14 upon which a plurality of circular shelves or the like 16 are mounted, each shelf being in its own individual compartment, the compartments being defined by partitions or the like 18. The compartments with their respective partitions 18 can be made in separate units, so that two or more sections can be mounted one above the other and become an integral part of a completed oven driven from the same motor and shaft, the shaft itself being constructed in sections which may be connected together. Corresponding front portions form part of the compartments, and the removal of any unit will automatically provide access to the interior of the next unit for repairs or adjustments.

A motor or other source of power 20 is employed for rotating the shaft 14, this being preferably by means of bevel-gears or the like 22, and each of the circular shelves 16 has mounted in conjunction therewith a guide or the like composed of concentric annular metal bands 24 positioned immediately above the shelf and adapted to retain the casseroles 26 or other food containers and supports in position on the shelves while the same are being rotated.

As best shown in Figure 3, a pair of spring-hinged doors 28 are provided for ready access to the interior of the oven and the subsequent easy positioning of casseroles or the like 26 on the shelves which operate in a clockwise direction viewed from the top.

A source of fuel such as gas or the like is provided in the way of a supply pipe 30 which leads to burners or the like 32 positioned in the respective compartments, and manual or automatic control of the supply of fuel and consequent degree of heat is accomplished by means of control elements 34.

Discharge of the flue gasses, smoke and the like is provided for by way of flues or other channels 36 mounted in the corners of the square casing in which the circular shelves are positioned, and these lead to the canopy 12 for suitable discharge through a flue or the like 38.

Food placed on the shelves 16 will be rotated through the oven compartments, and upon the contacting of the food containers with an ejector 40 in the shape of a suitably curved piece of metal or the like as best shown in Figures 3 and 4, the dishes will be automatically pushed off the circular shelves by reason of their further movement and deposited upon a landing plate or the like 42, from whence they can be manually removed through the swinging doors 44. Proper extending shelves 46 are provided in the front of the oven for temporary depositing of the food containers and their contents, if such is desired.

Whenever it is desired that the dishes remain in the oven longer than a single revolution of the shelves, the corresponding ejector 40 can be readily removed from its supports 48 by any suitable means such as a fork or the like, the tines of which can be inserted into openings 50 in the ejector, and the same then bodily removed from the oven compartment through the doors 44. The ejector 40 is provided with integral rearwardly and downwardly extending lugs 52 which cooperate with the supports 48, thereby enabling such ready removal and replacement.

Adjacent the circular oven structure is a combination range and oven as illustrated at 54 and 56 respectively for the preparation of foods in the ordinary manner, and positioned behind and above the range and oven structure is a series of heated compartments 58 wherein casseroles or food containers can be positioned for preliminary heating, and there is also provided a central compartment 60 wherein can be placed a container for hot soups or the like. The flue gasses from the oven are carried to the canopy 12 by means of channels or ducts 62 in the partitions between the compartments 58 and 60, thereby providing for a heating of these compartments by the heat from the oven and range, which heat would otherwise be wasted.

A modification of the invention is illustrated in Figure 6 wherein three driving elements for the shelves 16 are provided, these driving elements comprising a central shaft 64 and a plurality of tubes 66 and 68 concentrically surrounding the same and positioned thereon for separate rotation, this separate rotation being accomplished by means of individual bevel-gears and corresponding motors 70, 72, and 74 respectively.

Each of the motors is provided with a suitable rheostat or other speed control as shown at 76, 78 and 80 respectively, so that the corresponding shelves can be rotated at any desired speed and with individual effect, thereby allowing of the simultaneous preparation of various articles of food, many of which require different periods of time and various degrees of heat for their proper preparation.

Figure 7:
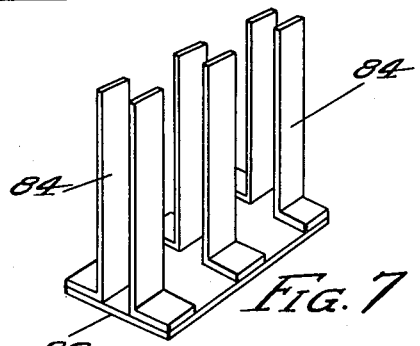
Figure 7 is a perspective view of the toast and steak grill adapted to be used in conjunction with the improved cooker of this invention.

In Figure 7 is shown an improved form of grill for the preparation of toast, grilled steaks, chops and the like, the same comprising a supporting plate 82 upon which is fixed a series of L-shaped upstanding supports 84 juxtaposed as shown for the ready reception and upright supporting of such articles as bread, steaks, and the like which are to be prepared as upon a grill. These grills are preferably positioned in one of the casseroles 26 when food is to be prepared therein, so as to eliminate undesirable dripping upon the circular plates or shelves 16 and the other portions of the oven.

Figure 8:
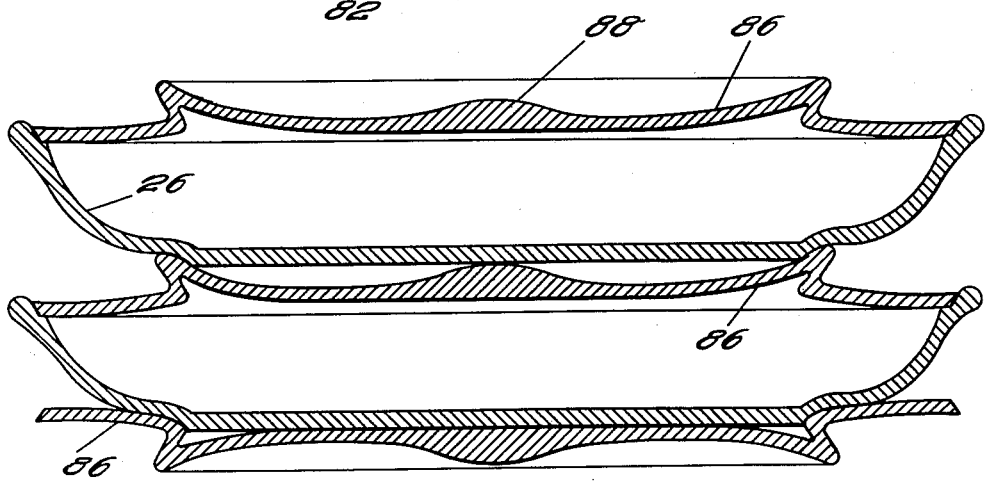
Figure 8 illustrates a preferred form of casserole, and combination top and support therefor which can be very suitably employed in conjunction with the cooking means of the present invention.

As best shown in Figure 8, each of the casseroles 26 is provided with a removable lid or cover 86 so shaped that when inverted it can be used as a stand or support for a casserole, this being illustrated at the bottom portion of the figure. A suitable handle 88 is provided on the lid 86 for ready manipulation thereof, and it will be noted that the casseroles constructed in accordance with this plan and having covers as shown can be stacked in nested relation whereby a plurality of such casseroles containing food can be simultaneously and economically handled and delivered for food serving purposes.

Figure 9:
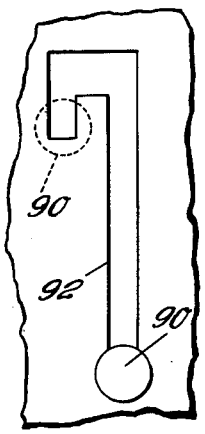
Figure 9 shows a means of operating a modified form of the discharge device for the oven.

In Figure 9 is shown a modified means for lifting the automatic discharge element 40 from discharging position. This comprises a handle 90 operating in a bayonet slot 92 in the oven casing and projecting outside thereof. When the handle is lifted into the upper position shown by the dotted lines, the automatic discharge element 40 will be raised out of the way of objects on the rotating shelves.

It will be evident that herein is provided an automatic circular oven and appurtenances which will enable the economical, speedy and tasty preparation of food in a highly efficient manner, while at the same time allowing of such preparation of many food articles by a single operator with the assurance that none of the items will be under-cooked or spoiled by over-cooking or burning. Additionally, the completely cooked food articles are automatically kept warm for a reasonable period of time, or in any event until the automatic ejection of further food products which have been later placed on the same shelf, whereupon the original containers will be forced outwardly through the swinging doors 44 and onto the shelf 46, whereupon they will immediately come to the attention of the operator or attendant. One installation of this equipment will suffice for the needs of an entire restaurant or hotel, and furthermore, the products thereof can include those which are baked, stewed, fried, or boiled.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. An automatic oven, comprising a casing having a plurality of compartments, a controlled heating means for each of the compartments, a rotatable shelf comprising the floor of each of said compartments, and means for rotating the shelves independently of each other and at different varying speeds, said means comprising a central operating shaft for one of the shelves, tubular shafts for the other shelves surrounding said central shaft, and separate drive means for each of the shafts and tubes.

2. An automatic oven, comprising a casing having a plurality of compartments, a controlled heating means for each of the compartments, a rotatable shelf comprising the floor of each of said compartments, and means for rotating the shelves independently of each other and at different varying speeds, said means comprising a central operating shaft for one of the shelves, tubular shafts for the other shelves surrounding said central shaft, and separate drive means for each of the shafts and tubes, and an individual rheostat-controlled motor for each of the shafts and tubes.

ALBERT P. STALLE.